United States Patent
Leyrer et al.

(10) Patent No.: US 11,336,757 B2
(45) Date of Patent: May 17, 2022

(54) SAMPLE BASED DATA TRANSMISSION OVER LOW-LEVEL COMMUNICATION CHANNEL

(71) Applicant: TEXAS INSTRUMENTS INCORPORATED, Dallas, TX (US)

(72) Inventors: Thomas Anton Leyrer, Freising (DE); Peter Aberl, Kranzberg (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 110 days.

(21) Appl. No.: 16/820,440

(22) Filed: Mar. 16, 2020

(65) Prior Publication Data

US 2020/0304611 A1    Sep. 24, 2020

Related U.S. Application Data

(60) Provisional application No. 62/820,315, filed on Mar. 19, 2019.

(51) Int. Cl.
*H04L 29/08* (2006.01)
*H04L 69/323* (2022.01)
*G06F 5/06* (2006.01)

(52) U.S. Cl.
CPC ............ *H04L 69/323* (2013.01); *G06F 5/065* (2013.01)

(58) Field of Classification Search
CPC ................................ G06F 5/065; H04L 69/323
See application file for complete search history.

(56) References Cited

U.S. PATENT DOCUMENTS

| | | | | |
|---|---|---|---|---|
| 6,038,235 A | * | 3/2000 | Ho | H04L 12/43 370/453 |
| 6,064,670 A | * | 5/2000 | Athenes | H04Q 11/08 370/375 |
| 2011/0314190 A1 | * | 12/2011 | Tanaka | G06F 5/065 710/52 |
| 2012/0057572 A1 | * | 3/2012 | Evans | H04W 88/085 370/338 |
| 2012/0303843 A1 | * | 11/2012 | Dove | H04L 49/9005 710/52 |
| 2013/0177026 A1 | | 7/2013 | Soni et al. | |

FOREIGN PATENT DOCUMENTS

| | | |
|---|---|---|
| WO | 2006083899 | 8/2006 |
| WO | 2015054738 | 4/2015 |

OTHER PUBLICATIONS

International Search Report in corresponding PCT Application No. PCT/US2020/023522, dated Jun. 18, 2020 (2 pages).

\* cited by examiner

*Primary Examiner* — Mohamed A. Wasel
(74) *Attorney, Agent, or Firm* — John R. Pessetto; Charles A. Brill; Frank D. Cimino

(57) ABSTRACT

A circuit includes a buffer, a first programmable real-time unit (PRU), and a second PRU. The first PRU is coupled to the buffer and configured to couple to an input interface. The first PRU is further configured to receive first data sampled by the input interface and receive second data sampled by the input interface. The first PRU is further configured to multiplex the first data and the second data to generate multiplexed data and transmit the multiplexed data to the buffer. The second PRU is coupled to the buffer and configured to couple to an output interface. The second PRU is further configured to obtain the multiplexed data from the buffer and transmit the multiplexed data via an Ethernet physical layer.

13 Claims, 5 Drawing Sheets

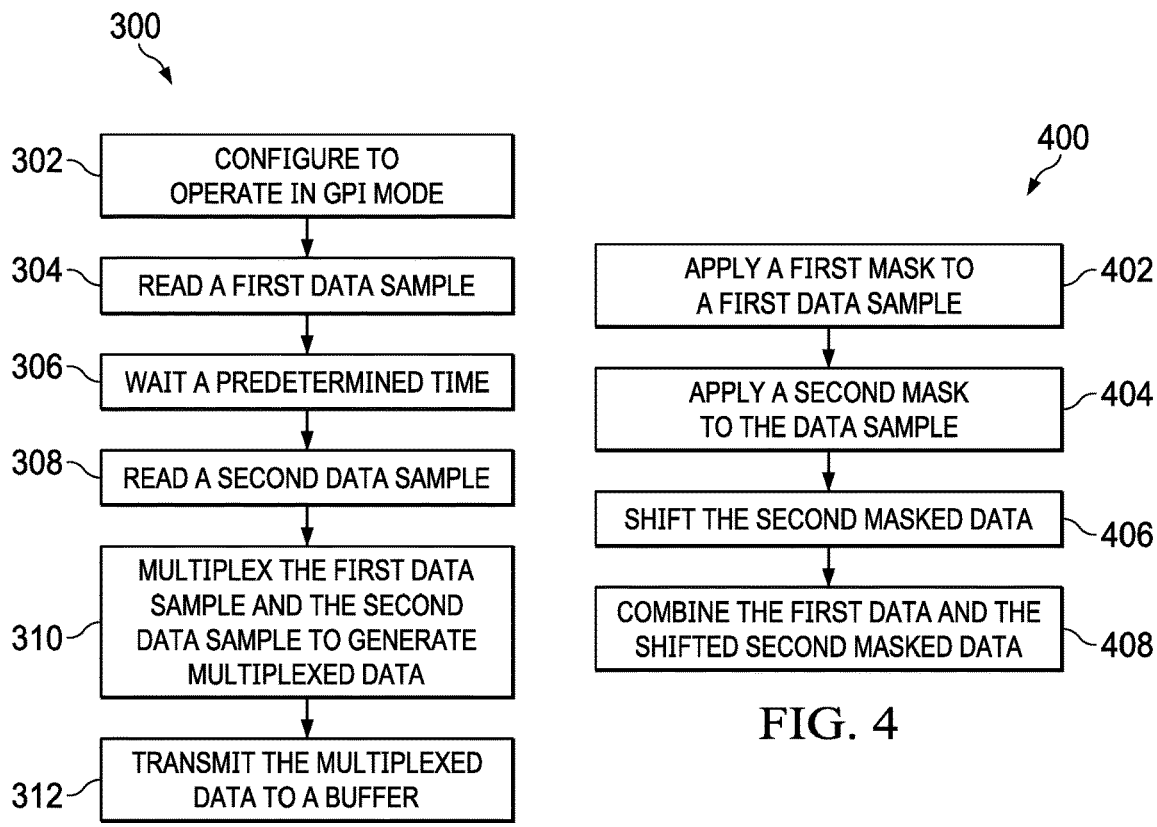
FIG. 3
FIG. 4
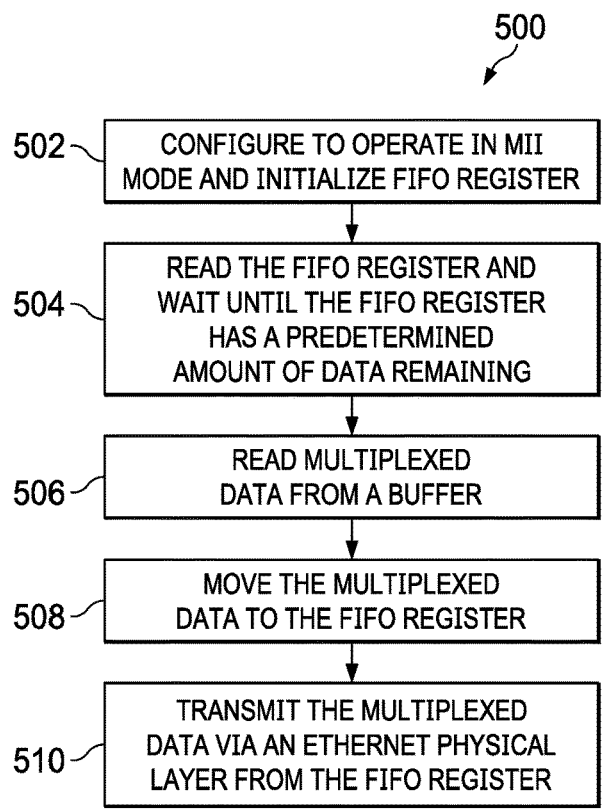
FIG. 5

SAMPLE BASED DATA TRANSMISSION OVER LOW-LEVEL COMMUNICATION CHANNEL

CROSS-REFERENCE TO RELATED APPLICATIONS

The present application claims priority to U.S. Provisional Patent Application No. 62/820,315, which was filed Mar. 19, 2019, is titled "SAMPLE BASED DATA TRANSMISSION OVER ETHERNET PHYSICAL LAYER," and is hereby incorporated herein by reference in its entirety.

SUMMARY

At least some aspects of the present disclosure provide for a circuit. In at least some examples, the circuit includes a buffer, a first programmable real-time unit (PRU), and a second PRU. The first PRU is coupled to the buffer and configured to couple to an input interface. The first PRU is further configured to receive first data sampled by the input interface and receive second data sampled by the input interface. The first PRU is further configured to multiplex the first data and the second data to generate multiplexed data and transmit the multiplexed data to the buffer. The second PRU is coupled to the buffer and configured to couple to an output interface. The second PRU is further configured to obtain the multiplexed data from the buffer and transmit the multiplexed data via an Ethernet physical layer.

Other aspects of the present disclosure provide for a system. In at least some examples, the system includes a low-level communication channel, a first microcontroller coupled to the low-level communication channel, and a second microcontroller coupled to the low-level communication channel. The first microcontroller is configured to sample a first general purpose input data interface to generate a first data sample and sample a second general purpose input data interface to generate a second data sample. The first microcontroller is further configured to combine the first data sample and the second data sample to generate combined data and transmit the combined data on a sample basis via the low-level communication channel. The second microcontroller is configured to receive the combined data transmitted on the sample basis via the low-level communication channel and separate the combined data to recreate the first data sample and the second data sample. The second microcontroller is further configured to output the first data sample to a first general purpose output data interface that corresponds to the first general purpose input data interface and output the second data sample to a second general purpose output data interface that corresponds to the second general purpose input data interface Other aspects of the present disclosure provide for a method. In some examples, the method comprises sampling a first data interface to generate a first data sample. The method further comprises sampling a second data interface to generate a second data sample. The method further comprises combining the first data sample and the second data sample to generate combined data. The method further comprises transmitting the combined data on a sample basis at an Ethernet physical layer of communication.

BRIEF DESCRIPTION OF THE DRAWINGS

For a detailed description of various examples, reference will now be made to the accompanying drawings in which:

FIG. 3 shows a flowchart of an illustrative method in accordance with various examples;
FIG. 4 shows a flowchart of an illustrative method in accordance with various examples;
FIG. 5 shows a flowchart of an illustrative method in accordance with various examples.

DETAILED DESCRIPTION

Figure 1:
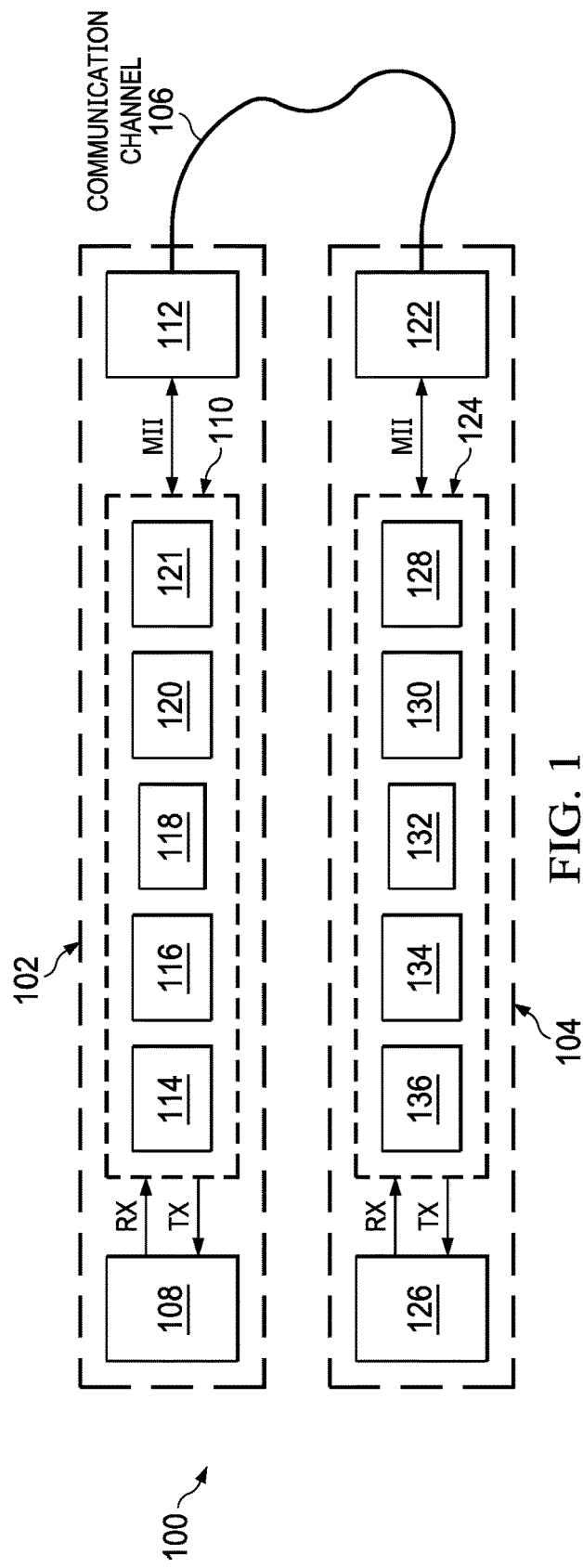
FIG. 1 shows a block diagram of an illustrative system in accordance with various examples.

As a number of electrical features and capabilities in devices grows, oftentimes so too does a number of conductors coupling electrical sensors, motors, actuators, and other devices to each other, to power sources, to controllers, etc. As the number of conductors grows, an associated cost does as well. For example, in at least some modern automobiles, over 100 processing units are present and collectively communicate according to ten or more communication interfaces. This communication is performed via approximately 3 kilometers worth of electrical conductors that together weigh 70 kilograms or more. In at least some examples, reducing the number of conductors implemented for communication brings various benefits, such as reduced cost of materials, increased performance (e.g., via reduction in collective weight of the conductors), and/or increased longevity of a device (e.g., less wear and tear because conductors weigh less and/or consume less space).

At least some aspects of the present disclosure provide for sample based data transmission over a low-level communication channel. In some examples, that low-level communication channel is an Ethernet physical layer. In other examples, that low-level communication channel is a low-voltage differential signaling (LVDS) signal line. Generally, a low-level communicating channel is one that does not require data being transmitted via the communication channel to be packaged into packets, frames, or other data structures that include additional data overhead. In at least some examples, the sample based transmission samples data from a plurality of input sources. In some examples, the input sources are of the same type or interface. In other examples, the input sources are of different types or interfaces. For example, available interfaces for use as input sources include controller area network (CAN) interfaces, local interconnect network (LIN) interfaces, single edge nibble transmission (SENT) interfaces, or any other suitable communication protocol or interface. While these interfaces are used herein for the sake of description and ease of understanding of the sample based data transmission over a low-level communication channel of the present disclosure, the disclosure is not limited to only these interfaces. Instead, the disclosure encompasses the sampling of input signal interfaces, regardless of type, at frequencies selected to meet timing requirements associated with communication protocols of those signal interfaces, and transmission of these sampled signals across a low-level communication channel such as an Ethernet physical layer.

In at least some example, the input sources are sampled, the sampled data is multiplexed to form a single data stream, and that data stream is transmitted over the low-level communication channel. In at least some examples, the transmission is performed via the low-level communication channel to facilitate fast transmission without involving higher-level processing. In at least one example in which the low-level communication channel is the Ethernet physical layer, the transmission is performed without packaging the data stream into Ethernet data packets or Ethernet data frames. In at least some examples, transmitting the data stream via the Ethernet physical layer provides a high degree of interoperability and flexibility and due to the ubiquity of Ethernet interface use while also enabling the transmission to meet timing requirements of the various input sources. For example, at least some implementations of the CAN interface require latency of less than about 1 microsecond. Ethernet data transmission utilizing packets or data frames, in some examples, incurs end-to-end latency of 3 microseconds or more depending on a size of the packets. Conversely, the sample based transmission over low-level communication channel of the present disclosure enables end-to-end latency of less than about 500 nanoseconds. This minimization of delay enables data such as CAN data to be transmitted over the Ethernet physical layer according to the sampling approach of the present disclosure while still meeting CAN protocol timing requirements and signal determinism.

Turning now to FIG. 1, a block diagram of an illustrative system 100 is shown. In at least some examples, the system 100 is representative of an automobile or a system implemented in an automobile. More generally, in at least some examples, the system 100 is representative of a transportation vehicle or a system implemented in a transportation vehicle (including an automobile, truck, airplane, helicopter, boat, two-wheeled vehicle, three-wheeled vehicle, rocket, spacecraft, or any other type of vehicle). In other examples, the system 100 is representative of an industrial device or a system implemented in an industrial device. For example, in various implementations the industrial device is a robot, a robotic arm, a computer-controlled machining tool, or any other device in which multiple conductors are implemented to facilitate communication with, monitoring of, and/or control of the industrial device.

In at least one example, the system 100 includes a device 102 and a device 104. The device 102 communicates with the device 104 via a communication channel 106. In some examples, the communication channel 106 comprises a single conductor implemented as a solid or stranded core conductive material. In other examples, the communication channel 106 comprises one or more conductors, such as arranged in one or more twisted pairs, where the one or more conductors collectively form a single wire. For example, in at least some examples in which communication performed over the communication channel 106 is performed on the Ethernet physical layer, the communication channel 106 comprises an Ethernet wire that includes conductors arranged to form four twisted pairs.

The device 102, in at least some implementations, includes an input interface 108, a microcontroller 110, and an output interface 112. The microcontroller 110, in at least some examples, includes a general purpose input output (GPIO) interface 114, a programmable real-time unit (PRU) 116, a buffer 118, a PRU 120, and a media-independent interface (MII) 121. In at least some implementations, the microcontroller 110 is instead any other suitable processing device such as a microprocessor, or a processor. In at least some examples, the microcontroller 110 is a PRU industrial communication subsystem (PRU-ICSS). The input interface 108 is, in some examples, a CAN interface. In other examples, the input interface 108 is a LIN interface. In yet other examples, the input interface 108 is a SENT interface or any other suitable communication interface. In at least some examples, the output interface 112 is an Ethernet physical layer interface. In other examples, the output interface 112 is a LVDS interface. In at least some examples, the input interface 108 is also an output interface and the output interface 112 is also an input interface (e.g., such that the input interface 108 and the output interface 112 are each capable of, or capable of facilitating, bi-directional data flow). While one input interface 108 is illustrated in FIG. 1, in various examples the device 102 includes, or is configured to couple to, any number of input interfaces of the same type (e.g., all CAN interfaces) or of varying types (e.g., CAN, LIN, SENT, etc.).

The device 104, in at least some implementations, includes an input interface 122, a microcontroller 124, and an output interface 126. The microcontroller 124, in at least some examples, includes a MII 128, a PRU 130, a buffer 132, a PRU 134, and a GPIO interface 136. In at least some implementations, the microcontroller 124 is instead any other suitable processing device such as a microprocessor, or a processor. In at least some examples, the microcontroller 124 is a PRU-ICSS. In at least some examples, the input interface 122 is an Ethernet physical layer interface. In other examples, the input interface 122 is a LVDS interface. The output interface 126 is, in some examples, a CAN interface. In other examples, the output interface 126 is a LIN interface. In yet other examples, the output interface 126 is a SENT interface or any other suitable communication interface. In at least some examples, the input interface 122 is also an output interface and the output interface 126 is also an input interface (e.g., such that the input interface 122 and the output interface 126 are each capable of, or capable of facilitating, bi-directional data flow). While one output interface 126 is illustrated in FIG. 1, in various examples the device 104 includes, or is configured to couple to, any number of output interfaces of the same type (e.g., all CAN interfaces) or of varying types (e.g., CAN, LIN, SENT, etc.).

In an example of operation, the microcontroller 110 receives data in a first format via the input interface 108 and outputs the data in a second format via the output interface 112. The data is received, in at least some examples, via the GPIO interface 114. For example, the data is written by the input interface 108 into a register (not shown) of the PRU 116. When data has been written into multiple registers of the PRU 116 by the GPIO interface 114 from multiple input interfaces such as the input interface 108, or from multiple samples in time from the input interface 108, the PRU 116 multiplexes the data of at least some of the multiple registers. The PRU 116 subsequently copies the multiplexed data to the buffer 118. In at least some examples, copying of the multiplexed data is performed in a single clock cycle. After the multiplexed data is copied from the PRU 116 to the buffer 118, the PRU 120 copies the multiplexed data to a register of the PRU 120. In at least some examples, the copying from the buffer 118 to the PRU 120 is performed in a single clock cycle. The PRU 120, in at least some examples, copies the contents of the register of the PRU 120 in reverse order to another register of the PRU 120 that is an output register. The output register, in at least some examples, outputs the data via the output interface 112.

The microcontroller 124 receives data via the input interface 122 that was output by the output interface 112. The data is written by the MII 128 from the input interface 122 into a register of the PRU 130. The data is, in some examples, multiplexed data, such as multiplexed by the PRU 116. The PRU 130 copies the data from the register of the PRU 130 to the buffer 132. In at least some examples, copying of the multiplexed data from the PRU 130 to the buffer 132 is performed in a single clock cycle. The PRU 134 copies the data from the buffer 132 to a register of the PRU 134. In at least some examples, copying of the multiplexed data to the PRU 134 is performed in a single clock cycle. The PRU 134 de-multiplexes the multiplexed data to recover original data that is output via the output interface 126.

Figure 2:
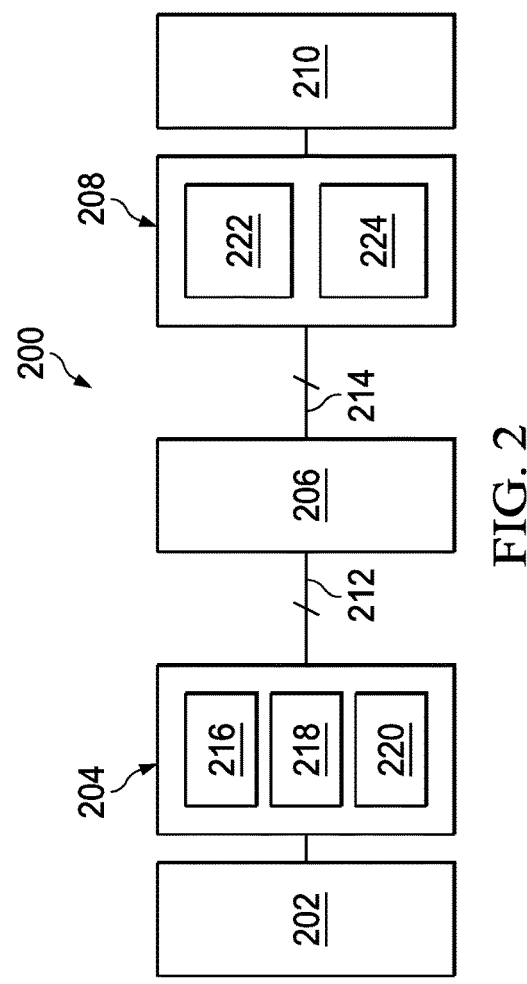
FIG. 2 shows a schematic diagram of an illustrative microcontroller in accordance with various examples.

Turning now to FIG. 2, a block diagram of an illustrative microcontroller 200 is shown. In at least some examples, the microcontroller 200 is suitable for implementation as the microcontroller 110 and/or the microcontroller 124 of the system 100 of FIG. 1. Accordingly, at least some components of the microcontroller 200 are suitable for implementation as like-named components of the microcontroller 110 and/or the microcontroller 124 of the system 100. In at least some examples the microcontroller 200 is a PRU-ICSS. In at least one implementation, the microcontroller 200 includes a GPIO interface 202, a PRU 204, a buffer 206, a PRU 208, and a MII interface 210. The PRU 204 is coupled to the buffer 206 via a bus 212 and the buffer 206 is coupled to the PRU 208 via a bus 214. In at least some examples, both the bus 212 and the bus 214 are broad-side data buses. For example, at least some implementations of the bus 212 and the bus 214 are 1000 bit wide data buses. In at least one example, the PRU 204 includes a register 216, a register 218, and a register 220. Similarly, in at least one example, the PRU 208 includes a register 222 and a register 224.

In an example of operation of the microcontroller 200, data is received at the GPIO interface 202. The data is, in some examples, data received from an interface such as a CAN interface, a LIN interface, a SENT interface, etc. In some examples, the data is received from a same interface but at different points in time (e.g., data from a CAN interface at time t1 and data from the same CAN interface at time t2 which is subsequent to time t1). In other examples, the data is received from a plurality of interfaces of any suitable type. The received data is, in some examples, first data that the GPIO interface 202 writes to the register 216. In at least some examples, the microcontroller 200 further receives second data that the GPIO interface 202 writes to the register 218. The PRU 204, in at least some examples, performs a plurality of logical operations on the data of the register 216 and the register 218 to multiplex the data of the register 216 and the register 218 into the register 220. The PRU 204 copies (or in some examples, moves) the multiplexed data from the register 220 to the buffer 206. In at least some examples, the buffer 206 is referred to as a scratch pad. The PRU 204, in some examples, copies the multiplexed data from the register 220 to the buffer 206 in a single clock cycle. Copying of the multiplexed data from the register 220 to the buffer 206 in a single clock cycle, in at least some examples, is enabled by a width (e.g., number of bits) of the bus 212.

In at least some examples, the PRU 204 waits to copy the multiplexed data from the register 220 to the buffer 206 until the PRU 204 reads a predetermined trigger value from the buffer 206. The predetermined trigger value is, in some examples, stored to the buffer 206 by the PRU 208 when the PRU 208 is ready for additional data. When the PRU 204 reads the predetermined trigger value from the buffer 206, the PRU 204 copies the multiplexed data from the register 220 to the buffer 206 as discussed above. After copying the multiplexed data from the register 220 to the buffer 206 the PRU 204 further writes a second predetermined trigger value to the buffer 206. The second predetermined trigger value, in at least some examples, informs the PRU 208 that data is available in the buffer 206 for the PRU 208 to read and further process and/or transmit.

When the PRU 208 reads the second predetermined trigger value from the buffer 206, the second PRU 208 copies the multiplexed data from the buffer 206 to the register 222. In at least some examples, the PRU 208 performs one or more logical operations on the multiplexed data (e.g., such as to invert the multiplexed data) and copies the modified multiplexed data to the register 224. The register 224 is, in some examples, a first-in, first-out (FIFO) register from which data is transmitted from the microcontroller 200. For example, the MII interface 210 reads data from the register 224 and outputs the data via a low-level communication channel (e.g., such as an Ethernet physical layer). After the PRU 208 reads and processes the data from the buffer 206 and is ready to process additional data (e.g., such as when an amount of data remaining in the register 24 reaches a threshold amount), in at least some examples the PRU 208 writes the predetermined trigger value to the buffer 206 to again be read by the PRU 204.

Turning now to FIG. 3, a flowchart of an illustrative method 300 is shown. In at least some examples, the method 300 is suitable for implementation by a microcontroller, such as the microcontroller 200 of FIG. 2, when the microcontroller 200 is implemented as the microcontroller 110 of the system 100 of FIG. 1. Accordingly, reference is made to at least some components of the microcontroller 200 in describing the method 300. In at least some examples, the method 300 is implemented by the PRU 204. The method 300 is, in some examples, a method of data receipt via a GPIO interface, as discussed herein.

At operation 302, the PRU 204 is configured to operate in a general purpose input (GPI) mode of operation. In at least some examples, the PRU 204 being configured to operate in the GPI mode of operation enables the GPIO interface 202 to write data into one or more registers of the PRU 204. In at least some examples, the data written into the registers of the PRU 204 by the GPIO interface 202 is data from a CAN interface, a LIN interface, and/or a SENT interface.

At operation 304, the PRU 204 reads a first data sample. The first data sample is read from a register of the PRU 204. The first data sample corresponds to data from a CAN interface, a LIN interface, and/or a SENT interface as written into the register of the PRU 204 by the GPIO interface 202.

At operation 306, the PRU 204 waits a predetermined amount of time. In at least some examples, the PRU 204 waits about 36 nanoseconds. 36 nanoseconds, in at least some examples, corresponds to execution of nine no-operation commands, each corresponding to one clock cycle of about 4 nanoseconds (e.g., in a system operating according to a clock signal at a frequency of about 250 megahertz). In at least some implementations of the method 300, the operation 306 is omitted.

At operation 308, the PRU 204 reads a second data sample. The second data sample is read from a register of the PRU 204. The second data sample corresponds to data from a CAN interface, a LIN interface, and/or a SENT interface as written into the register of the PRU 204 by the GPIO interface 202.

At operation 310, the PRU 204 multiplexes the first data sample and the second data sample to generate multiplexed data. The multiplexed data includes, in at least some examples, some of the first data sample and some of the second data sample. At least one examples of a process of multiplexing the first data sample and the second data sample to generate the multiplexed data is further described below with respect to FIG. 4.

At operation 312, the PRU 204 transmits the multiplexed data to the buffer 206. In at least some examples, the multiplexed data is transmitted to the buffer 206 in a single clock cycle via a broad side data bus, as described elsewhere herein. After transmitting the multiplexed data, in at least some examples, the PRU 204 further transmits a trigger value to the buffer 206 to inform the PRU 208 that the multiplexed data is present in the buffer 206 for reading by the PRU 208. In at least some examples, the PRU 204 transmits multiplexed data to the buffer 206 once every 52 nanoseconds (e.g., once every 13 clock cycles in a system operating according to a clock signal at a frequency of about 250 megahertz). In other examples, the PRU 204 transmits multiplexed data to the buffer 206 when the PRU 204 reads a predetermined trigger value from the buffer 206 that was written to the buffer 206 by the PRU 208, as discussed elsewhere herein.

Turning now to FIG. 4, a flowchart of an illustrative method 400 is shown. In at least some examples, the method 400 is suitable for implementation by a microcontroller, such as the microcontroller 200 of FIG. 2, when the microcontroller 200 is implemented as the microcontroller 110 of the system 100 of FIG. 1. Accordingly, reference is made to at least some components of the microcontroller 200 in describing the method 400. In at least some examples, the method 400 is implemented by the PRU 204. The method 400 is an exemplary implementation of data multiplexing, such as discussed above with respect to operation 310 of the method 300 of FIG. 3.

At operation 402, the PRU 204 applies a first mask to a first data sample. In at least some examples, the first data sample is stored in a first register and data resulting from the masking of the first data sample is stored in a second register. The mask, in at least some examples, isolates and/or selects only data bits of interest. For example, in some implementations the mask includes a logical "1" value for each bit of interest of the first data sample and a logical AND operation is performed between the mask and the first data sample. A result of that logical AND operation is stored in the second register.

At operation 404, the PRU 204 applies a second mask to a data sample. In at least some examples, the data sample is the first data sample. In other examples, the data sample is a second data sample. The masking is performed, in at least some examples, in a manner substantially the same as described with respect to operation 402, but with a result of the masking being stored in a third register.

At operation 406, the second masked data is shifted. The second masked data is shifted, in at least some examples, to align the second masked data to a bit position adjacent to the first masked data. The second masked data is shifted, in at least some examples, by performing a logical shift operation.

At operation 408, the first masked data and the shifted second masked data are combined. The masked data are combined, in some examples, by performing a logical OR operation between the second register and the third register. In at least some examples, a result of the combining is stored in the second register or the third register. In other examples, the result of the combining is stored in a different register.

In at least some examples, the result of operation 408 is the multiplexed data, as discussed elsewhere herein.

Although not shown in the method 400, in various examples the operations 404 through 408 are performed one or more additional times with one or more different masks to select different data bits. In at least some of these examples in which operations 404 through 408 are repeated, a result of operation 408 is combined with a result of a repeat of operation 408. In at least some examples, this result of the combination of the result of operation 408 with the result of the repeat of operation 408 is the multiplexed data, as discussed elsewhere herein.

Turning now to FIG. 5, a flowchart of an illustrative method 500 is shown. In at least some examples, the method 500 is suitable for implementation by a microcontroller, such as the microcontroller 200 of FIG. 2, when the microcontroller 200 is implemented as the microcontroller 110 of the system 100 of FIG. 1. Accordingly, reference is made to at least some components of the microcontroller 200 in describing the method 500. In at least some examples, the method 500 is implemented by the PRU 208. The method 500 is, in some examples, a method of data transmission on an Ethernet physical layer (or LVDS interface) as discussed herein.

At operation 502, the PRU 208 is configured to operate in a MII mode of operation and a FIFO register is initialized. In at least some examples, the PRU 208 being configured to operate in the MII mode of operation enables the MII interface 210 to output data to an Ethernet physical layer. In at least some examples, the FIFO register holds data that the MII interface 210 outputs or transmits via the Ethernet physical layer.

At operation 504, the PRU 208 reads the FIFO register and waits until the FIFO register has a predetermined amount of data remaining that has not yet been sent. In at least some examples, the predetermined amount of data is one nibble of data. In other examples, the predetermined amount of data is any suitable amount of data. In at least some examples, waiting until the FIFO register has the predetermined amount of data prevents data overflow by loading too much data into the FIFO register before existing data in the FIFO register can be sent. Waiting until the FIFO register has the predetermined amount of data also prevents data underflow by loading more data into the FIFO register before all existing data in the FIFO register is sent. In at least some examples, the PRU 208 writes the predetermined trigger value, as discussed elsewhere herein, to the buffer 206 after completing operation 504.

At operation 506, the PRU 208 reads the multiplexed data from the buffer 206. In at least some examples, the PRU 208 reads the multiplexed data from the buffer 206 responsive to reading the second predetermined trigger value from the buffer 206, as discussed elsewhere herein. For example, presence of the second predetermined trigger in the buffer 206 indicates to the PRU 208 that the multiplexed data is available in the buffer 206 for reading by the PRU 208.

At operation 508, the PRU 208 moves the multiplexed data to the FIFO register. In at least some examples, moving the multiplexed data to the FIFO register queues the multiplexed data for transmission by the MII interface 210 from the FIFO register via the Ethernet physical layer. After moving the multiplexed data to the FIFO register, in at least some examples, the method 500 returns to operation 504.

In some examples, the method 500 further includes operation 510. At operation 510, data is transmitted via the Ethernet physical layer from the FIFO register. In other examples, data is transmitted via an LVDS interface from the FIFO register. The transmitting is performed, in some examples, by the MII interface 210. In at least some examples, operation 508 proceeds to both operation 504 and operation 510 in parallel. In other examples, although not shown in FIG. 5, operation 508 instead proceeds to operation 510 and operation 510 then returns to operation 504 after transmitting the data.

Figure 6:
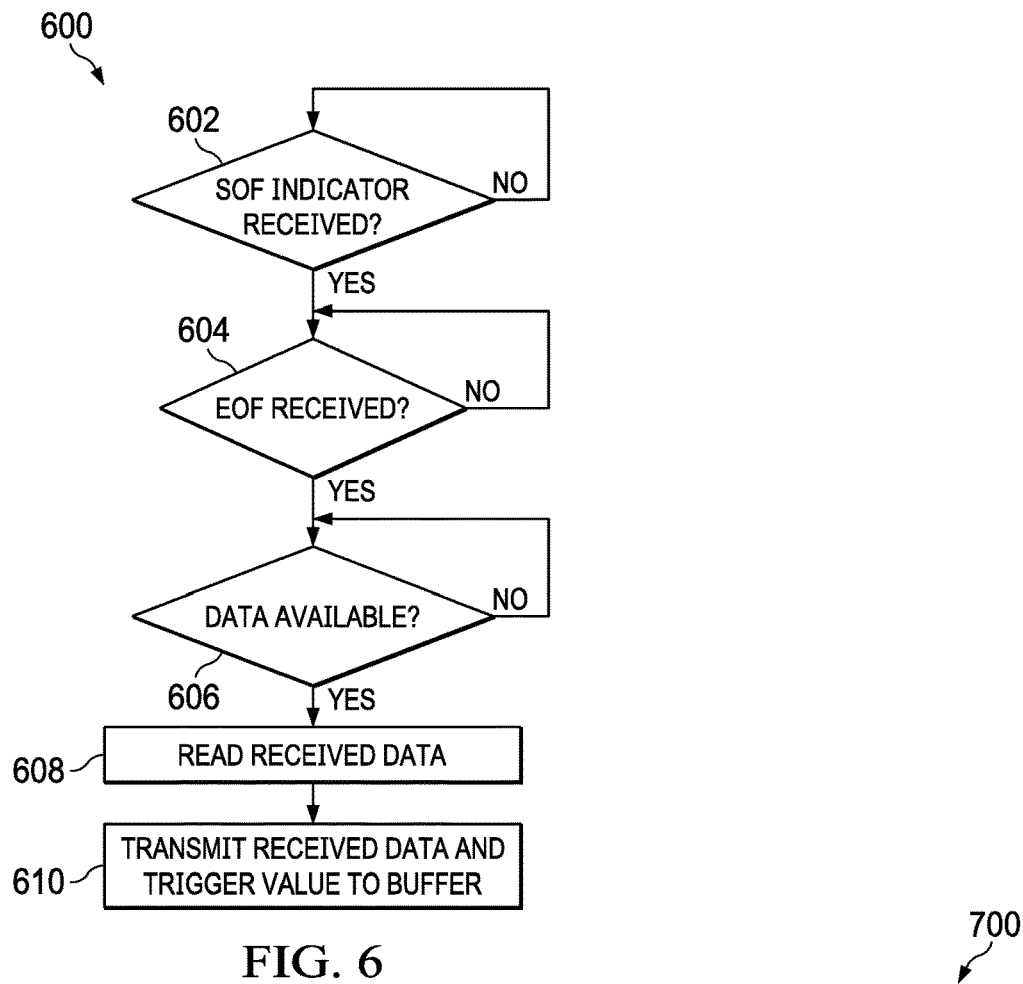
FIG. 6 shows a flowchart of an illustrative method in accordance with various examples.

Turning now to FIG. 6, a flowchart of an illustrative method 600 is shown. In at least some examples, the method 600 is suitable for implementation by a microcontroller, such as the microcontroller 200 of FIG. 2, when the microcontroller 200 is implemented as the microcontroller 124 of the system 100 of FIG. 1. Accordingly, reference is made to at least some components of the microcontroller 200 in describing the method 600. In at least some examples, the method 600 is implemented by the PRU 208. The method 600 is, in some examples, a method of data receipt from an Ethernet physical layer (or LVDS interface) as discussed herein.

At operation 602, the PRU 208 monitors for receipt of a start of frame (SOF) indicator. The SOF indicator is, in some examples, an SOF data bit output by an MII interface transmitting data on an Ethernet physical layer. The SOF indicator, in at least some examples, indicates the beginning of a stream of data output by the MII interface for receipt by the PRU 208. When the SOF indicator is not received, the method 600 remains at operation 602. When the SOF indicator is received, the method 600 proceeds to operation 604.

At operation 604, the PRU 208 monitors for receipt of an end of frame (EOF) indicator. The EOF indicator is, in some examples, an EOF data bit output by an MII interface transmitting data on an Ethernet physical layer. The EOF indicator, in at least some examples, indicates the end of a stream of data output by the MII interface for receipt by the PRU 208. When the EOF indicator is not received, the method 600 remains at operation 604. When the EOF indicator is received, the method 600 proceeds to operation 606.

At operation 606, the PRU 208 determines whether received data is available in a register of the PRU 208. The register is, in some examples, a FIFO register that receives data transmitted to the PRU 208 via an Ethernet physical layer. When the data is not available, the method 600 remains at operation 606. When the data is available, the method 600 proceeds to operation 608.

At operation 608, the data determined to be available at operation 606 is read from the register. The data is read, in at least some examples, by the PRU 208. The read data is, in at least some examples, multiplexed data (e.g., data representing several different samples, multiplexed for transmission together in a single data stream via the Ethernet physical layer, as discussed elsewhere herein).

At operation 610, the read data is transmitted to a buffer and a trigger value is set in the buffer. The trigger value, in at least some examples, informs another device (such as the PRU 204) that the read data is available in the buffer. After transmitting the received data and the trigger value to the buffer, in at least some examples the method 600 returns to operation 602 to await additional data. In other examples, one or more operations exist after the operation 610 before returning to the operation 602. These operations include, in some examples, advance a pointer associated with the register to prepare for receipt of additional received data to be written into the register.

Figure 7:
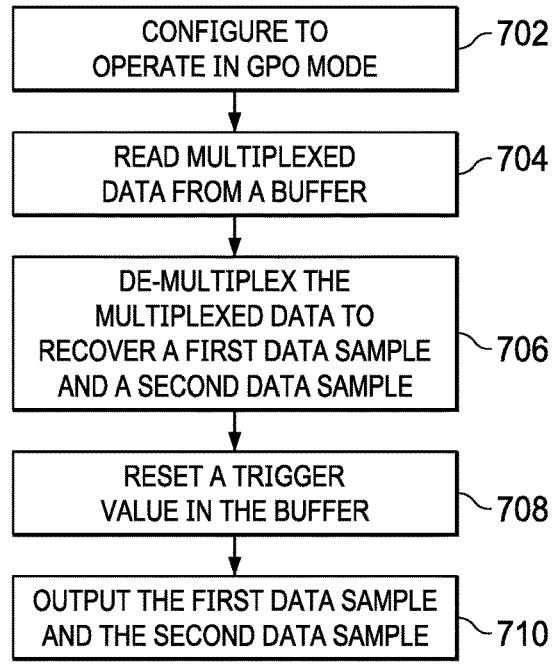
FIG. 7 shows a flowchart of an illustrative method in accordance with various examples.

Turning now to FIG. 7, a flowchart of an illustrative method 700 is shown. In at least some examples, the method 700 is suitable for implementation by a microcontroller, such as the microcontroller 200 of FIG. 2, when the microcontroller 200 is implemented as the microcontroller 124 of the system 100 of FIG. 1. Accordingly, reference is made to at least some components of the microcontroller 200 in describing the method 700. In at least some examples, the method 700 is implemented by the PRU 204. The method 700 is, in some examples, a method of data transmission on a GPIO interface, as discussed elsewhere herein.

At operation 702, the PRU 204 is configured to operate in a general purpose output (GPO) mode of operation. In at least some examples, the PRU 204 being configured to operate in the GPO mode of operation enables the GPIO interface 202 to read and output data from one or more registers of the PRU 204. In at least some examples, the data read from the registers of the PRU 204 by the GPIO interface 202 is data transmitted to a CAN interface, a LIN interface, and/or a SENT interface.

At operation 704, the PRU 204 reads multiplexed data from the buffer 206 and writes the multiplexed data into a register of the PRU 204. The multiplexed data is data, in at least some examples, written into the buffer 206 by the PRU 208. In at least some examples, the PRU 204 reads the multiplexed data from the buffer 206 after determining that the PRU 208 has written a predetermined trigger value into the buffer 206. The determination is made, in some examples, based on a presence of the predetermined trigger value in the buffer 206. In at least some examples, the predetermined trigger value indicates that the PRU 208 has written the multiplexed data to the buffer 206 for reading by the PRU 204.

At operation 706, the PRU 204 de-multiplexes the multiplexed data to recover a first data sample and a second data sample. At least one examples of a process of de-multiplexing the multiplexed data to recover the first data sample and the second data sample is further described below with respect to FIG. 8.

At operation 708, the PRU 204 resets the predetermined trigger value in the buffer 206. In at least some examples, the PRU 204 resets the predetermined trigger value by clearing all data bits in a register containing the predetermined trigger value (e.g., by performing a logical AND operation between the predetermined trigger value and a value of zero).

At operation 710, the PRU 204 outputs the first data sample and the second data sample. In at least some examples, the first data sample and the second data sample are output by the GPIO interface 202. In at least some examples, the GPIO interface 202 outputs a first portion of the first data sample and/or the second data sample to a first interface (e.g., such as a CAN interface) and outputs a second portion of the first data sample and/or the second data sample to a second interface (e.g., such as a LIN interface or a SENT interface).

Figure 8:
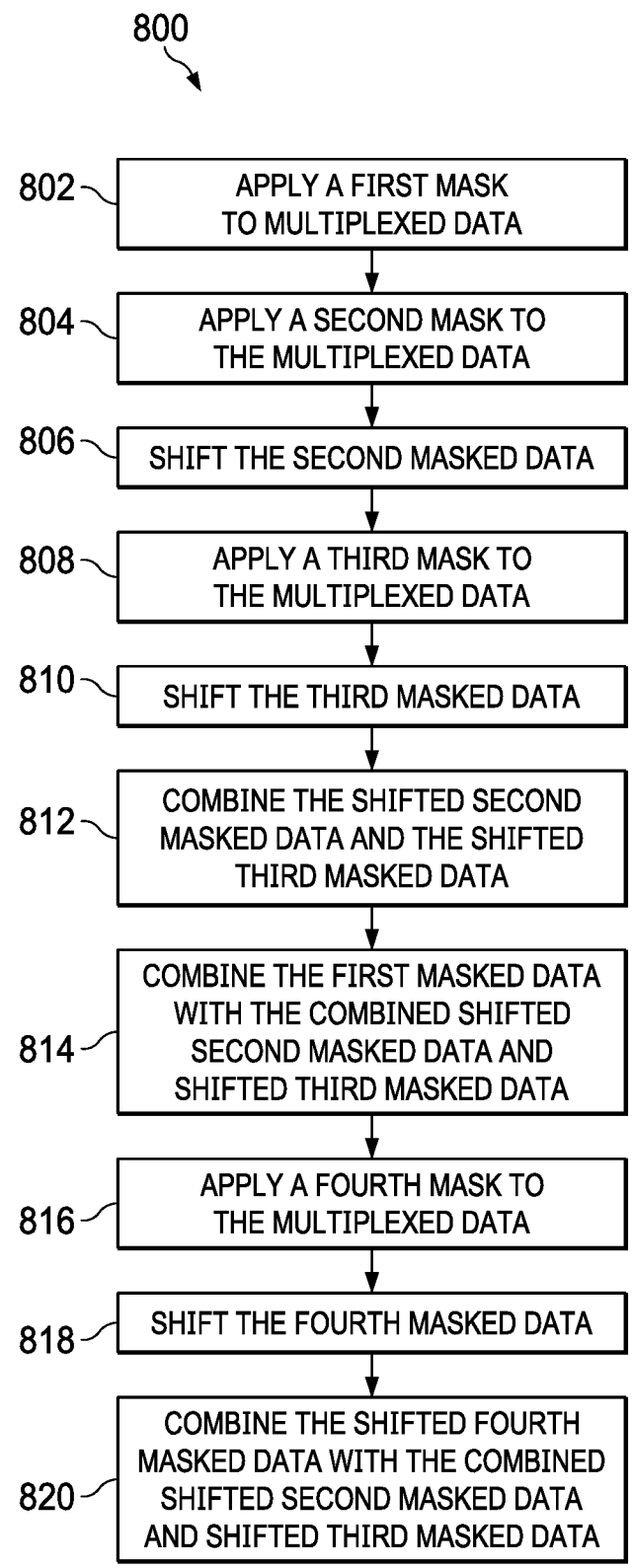
FIG. 8 shows a flowchart of an illustrative method in accordance with various examples.

Turning now to FIG. 8, a flowchart of an illustrative method 800 is shown. In at least some examples, the method 800 is suitable for implementation by a microcontroller, such as the microcontroller 200 of FIG. 2, when the microcontroller 200 is implemented as the microcontroller 124 of the system 100 of FIG. 1. Accordingly, reference is made to at least some components of the microcontroller 200 in describing the method 400. In at least some examples, the method 400 is implemented by the PRU 204. The method 400 is an exemplary implementation of data de-multiplexing, such as discussed above with respect to operation 706 of the method 700 of FIG. 7.

At operation 802, the PRU 204 applies a first mask to multiplexed data. In at least some examples, the multiplexed data is stored in a first register and data resulting from the masking of the multiplexed is stored in a second register. The mask, in at least some examples, isolates and/or selects only data bits of interest. For example, in some implementations the mask includes a logical "1" value for each bit of interest of the multiplexed data and a logical AND operation is performed between the mask and the multiplexed data. A result of that logical AND operation is stored in the second register.

At operation 804, the PRU 204 applies a second mask to the multiplexed data. The masking is performed, in at least some examples, in a manner substantially the same as described with respect to operation 802, but with a result of the masking being stored in a third register.

At operation 806, the second masked data is shifted. The second masked data is shifted, in at least some examples, to separate the second masked data from the first masked data by one or more bits. The second masked data is shifted, in at least some examples, by performing a logical shift operation. A number of positions (e.g., bits) by which the second masked data is shifted is determined according to a particular multiplexing process utilized in generating the multiplexed data. For example, in some implementations the number of positions by which the second masked data is shifted should be equal in magnitude and opposite in direction to a shift performed in masking the data, such as at operation 406 of the method 400 of FIG. 4.

At operation 808, the PRU 204 applies a third mask to the multiplexed data. The masking is performed, in at least some examples, in a manner substantially the same as described with respect to operation 802, but with a result of the masking being stored in a fourth register.

At operation 810, the third masked data is shifted. The shifting of the third masked data is performed, in at least some examples, in a manner substantially the same as described with respect to operation 806. A number of positions (e.g., bits) by which the third masked data is shifted is determined according to a particular multiplexing process utilized in generating the multiplexed data.

At operation 812, the shifted second masked data and the shifted third masked data are combined. The masked data are combined, in some examples, by performing a logical OR operation.

At operation 814, a result of operation 812 and the first masked data are combined. In at least some examples, the result of operation 814 is the first data sample, as discussed elsewhere herein.

At operation 816, the PRU 204 applies a fourth mask to the multiplexed data. The masking is performed, in at least some examples, in a manner substantially the same as described with respect to operation 802, but with a result of the masking being stored in a fifth register.

At operation 818, the fourth masked data is shifted. The shifting of the fourth masked data is performed, in at least some examples, in a manner substantially the same as described with respect to operation 806. A number of positions (e.g., bits) by which the fourth masked data is shifted is determined according to a particular multiplexing process utilized in generating the multiplexed data.

At operation 820, a result of operation 812 and the shifted fourth masked data are combined. In at least some examples, the result of operation 820 is the second data sample, as discussed elsewhere herein.

Figure 9:
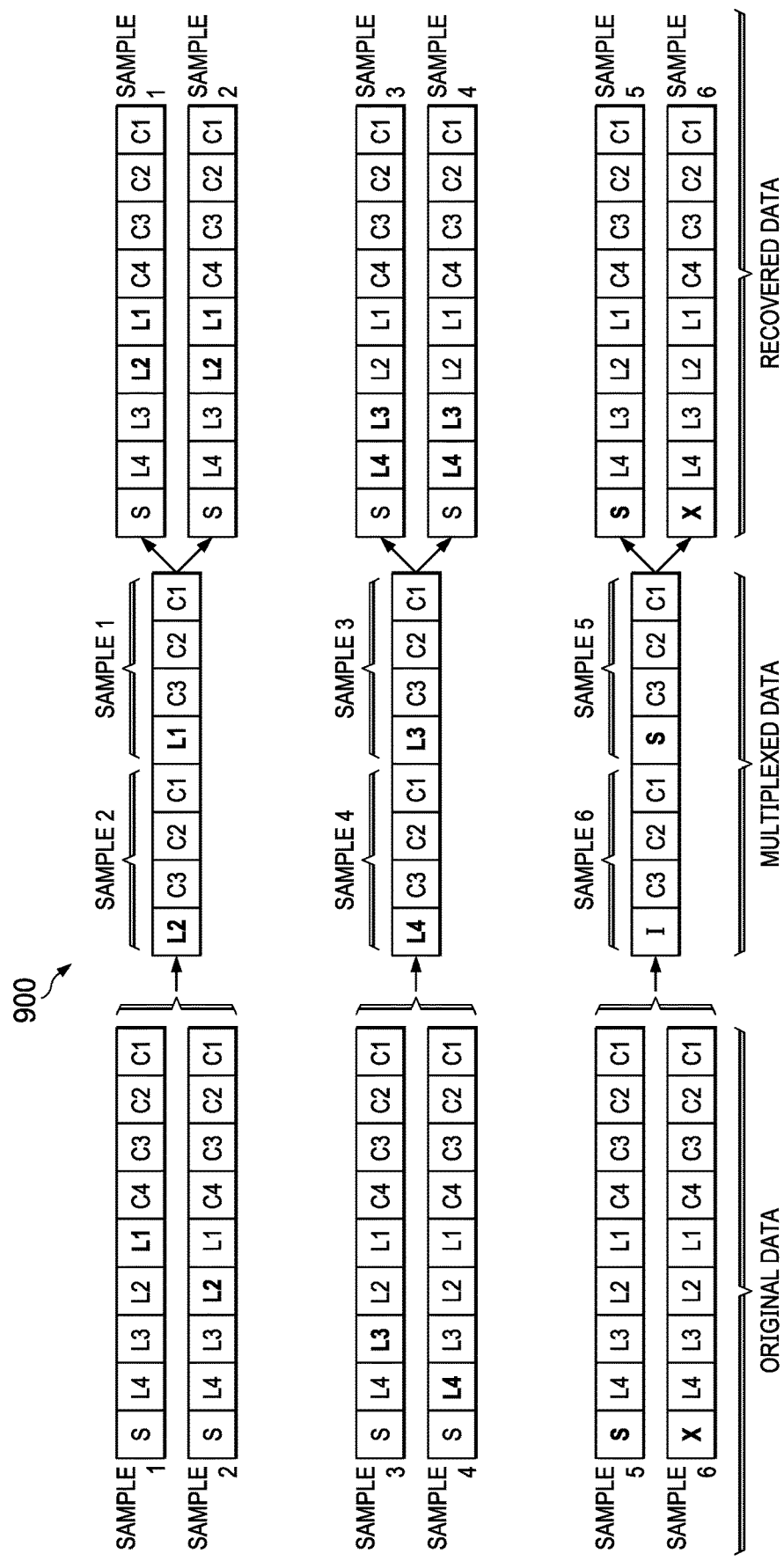
FIG. 9 shows an illustrative diagram of data transformations in accordance with various examples.

Turning now to FIG. 9, an illustrative diagram 900 of data transformations is shown. The diagram 900 is representative of at least some data present in a microcontroller, such as the microcontroller 200 of FIG. 2, when the microcontroller 200 is implemented as the microcontroller 110 of the system 100 of FIG. 1. Accordingly, reference is made to at least some components of the microcontroller 200 in describing the diagram 900.

The diagram 900 illustrates samples 1 through 6 of original data. The original data is data, in at least some examples, written into a register of the PRU 204 by the GPIO interface 202. The original data, as illustrated in the diagram 900, is 9 bits in width. Further, as illustrated in the diagram 900, data C1, C2, C3, and C4 corresponds to data received from a CAN interface, data L1, L2, L3, and L4 corresponds to data received from a LIN interface, and data S corresponds to data received from a SENT interface. The diagram 900 further illustrates multiplexed data 1 through 3, where multiplexed data 1 includes data from sample 1 and sample 2, multiplexed data 2 includes data from sample 3 and sample 4, and multiplexed data 3 includes data from sample 5 and sample 6.

In at least some examples, no sample is taken from an external data source (e.g., an input interface). For example, sample 6 of the original data includes an X placeholder indicating that no sample was taken from an external data source. Instead, the microcontroller utilizes the available space of the sample to include a synchronization pattern or other data. The synchronization pattern is illustrated in sample 6 of the multiplexed data as I.

As illustrated by the diagram 900, in at least some examples the multiplexed data is generated by masking, shifting, and combining bits of sample 1 and sample 2. For example, C1, C2, and C3 are masked out of sample 1. L1 is further masked out from sample 1, shifted right by one position, and combined with C1, C2, and C3 to form the sample 1 portion of multiplexed data 1. Similarly, C1, C2, and C3 are masked out of sample 2. L2 is further masked out from sample 2, shifted right by two positions, and combined with C1, C2, and C3 to form the sample 2 portion of multiplexed data 1. The sample 1 portion of multiplexed data 1 and the sample 2 portion of multiplexed data 1 are then combined together to form multiplexed data 1 for transmission to another component (e.g., such as the PRU 208 by way of the buffer 206). Although not described herein for the sake of brevity and clarity of description, in at least some examples multiplexed data 2 and multiplexed data 3 are generated according to the same principles as multiplexed data 1.

The diagram 900 further illustrates recovered data 1 through 6, where recovered data 1 and 2 are recovered from multiplexed data 1, recovered data 3 and 4 are recovered from multiplexed data 2, and recovered data 5 and 6 are recovered from multiplexed data 3. As illustrated by the diagram 900, in at least some examples L1 and L2 of multiplexed data 1 are common across both recovered data 1 and recovered data 2. However, C1, C2, and C3 of recovered data 1 and recovered data 2 are unique, respectively corresponding to the two separate sequences of C1, C2, and C3 included in multiplexed data 1. In at least some examples, data bits of recovered data 1 and recovered data 2 that were not included in multiplexed data 1 are set to a default value of zero. Although not described herein for the sake of brevity and clarity of description, in at least some examples recovered data 3 through 6 are recovered according to the same principles as recovered data 1 and 2.

While the operations of the various methods described herein have been discussed and labeled with numerical reference, in various examples the methods include additional operations that are not recited herein. In some examples any one or more of the operations recited herein include one or more sub-operations. In some examples any one or more of the operations recited herein is omitted. In some examples any one or more of the operations recited herein is performed in an order other than that presented herein (e.g., in a reverse order, substantially simultaneously, overlapping, etc.). Each of these alternatives is intended to fall within the scope of the present disclosure.

In the foregoing discussion, the terms "including" and "comprising" are used in an open-ended fashion, and thus should be interpreted to mean "including, but not limited to . . . ." The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

While certain components are described herein as being of a particular process, these components may be exchanged for components of other process technologies and reconfiguring circuits including the replaced components to provide desired functionality at least partially similar to functionality available prior to the component replacement. Components illustrated as resistors, unless otherwise stated, are generally representative of any one or more elements coupled in series and/or parallel to provide an amount of impedance represented by the illustrated resistor. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about", "approximately", or "substantially" preceding a value means+/−10 percent of the stated value.

The above discussion is meant to be illustrative of the principles and various examples of the present disclosure. Numerous variations and modifications will become apparent to those skilled in the art once the above disclosure is fully appreciated. It is intended that the present disclosure be interpreted to embrace all such variations and modifications.

What is claimed is:

1. A circuit, comprising:
a buffer;
a first programmable real-time unit (PRU) coupled to the buffer and configured to couple to an input interface, wherein the first PRU is further configured to:
  receive first data sampled by the input interface;
  receive second data sampled by the input interface;
  multiplex the first data and the second data to generate multiplexed data; and
  transmit the multiplexed data to the buffer; and
a second PRU coupled to the buffer and configured to couple to an output interface, wherein the second PRU is further configured to:
  obtain the multiplexed data from the buffer; and
  transmit the multiplexed data via an Ethernet physical layer.

2. The circuit of claim 1, wherein the input interface is a general purpose input/output interface and wherein the output interface is a media independent interface.

3. The circuit of claim 1, wherein the received data is sampled from a controller area network (CAN) interface, a local interconnect network (LIN) interface, or a single edge nibble transmission (SENT) interface.

4. The circuit of claim 1, wherein the second PRU is further configured to:
  store the multiplexed data for transmission via the Ethernet physical layer in a first-in, first-out (FIFO) register;
  store a first trigger value in the buffer when a predetermined amount of data remains in the FIFO register; and
  obtain the multiplexed data from the buffer when the second PRU determines that a second trigger value is stored in the buffer, and
wherein the first PRU is further configured to:
  store the multiplexed data in the buffer when the first PRU determines that the first trigger value is stored in the buffer; and
  store the second trigger value in the buffer after storing the multiplexed data in the buffer.

5. The circuit of claim 1, further comprising a microcontroller, comprising:
a second buffer;
a third PRU coupled to the second buffer and configured to couple to a second input interface, wherein the third PRU is further configured to:
  receive the multiplexed data via the Ethernet physical layer; and
  transmit the multiplexed data to the second buffer; and
a fourth PRU coupled to the second buffer and configured to couple to a second output interface, wherein the fourth PRU is further configured to:
  obtain the multiplexed data from the second buffer;
  de-multiplex the multiplexed data to recover the first data and the second data; and
  transmit the first data and the second data via the second output interface.

6. The circuit of claim 5, wherein the second output interface is a general purpose input/output interface and wherein the output interface is a media independent interface.

7. The circuit of claim 1, wherein the multiplexed data is transmitted via the Ethernet physical layer as sample based communication without utilizing Ethernet packets.

8. A system, comprising:
a low-level communication channel;
a first microcontroller coupled to the low-level communication channel, wherein the first microcontroller is configured to:
sample a first general purpose input data interface to generate a first data sample;
sample a second general purpose input data interface to generate a second data sample;
combine the first data sample and the second data sample to generate combined data; and
transmit the combined data on a sample basis via the low-level communication channel; and
a second microcontroller coupled to the low-level communication channel, wherein the second microcontroller is configured to:
receive the combined data transmitted on the sample basis via the low-level communication channel;
separate the combined data to recreate the first data sample and the second data sample;
output the first data sample to a first general purpose output data interface that corresponds to the first general purpose input data interface; and
output the second data sample to a second general purpose output data interface that corresponds to the second general purpose input data interface.

9. The system of claim 8, wherein the low-level communication channel is a channel capable of data transmission at an Ethernet physical layer.

10. The system of claim 9, wherein the combined data is transmitted at the Ethernet physical layer without packaging the combined data into Ethernet packets.

11. The system of claim 8, wherein the low-level communication channel is a channel capable of data transmission according to low-voltage differential signaling.

12. The system of claim 8, wherein combining the first data sample and the second data sample to generate the combined data comprises multiplexing the first data sample and the second data sample to generate the combined data, and wherein separating the combined data to recreate the first data sample and the second data sample comprises de-multiplexing the combined data to recover the first data sample and the second data sample.

13. The system of claim 8, wherein the first general purpose input data interface and the second general purpose input data interface are each one of a controller area network (CAN) interface, a local interconnect network (LIN) interface, or a single edge nibble transmission (SENT) interface, and wherein the first general purpose output data interface and the second general purpose output data interface have a same respective type as the first general purpose input data interface and the second general purpose input data interface.

* * * * *